(No Model.)
B. E. CAGLE.
CORN PLANTER.
No. 428,827. Patented May 27, 1890.
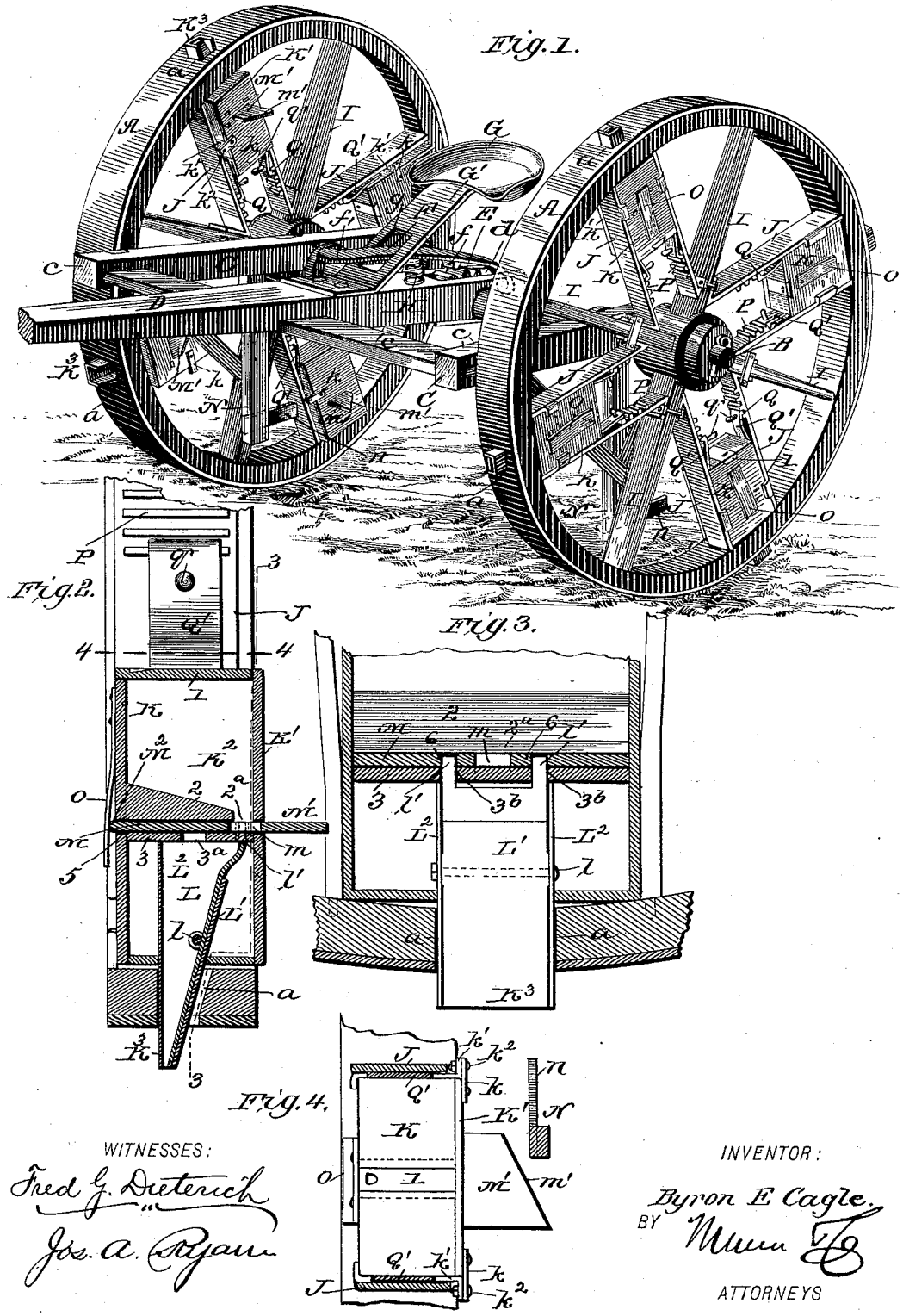
WITNESSES:
Fred G. Dieterich
Jos. A. Ryan
INVENTOR:
Byron E. Cagle.
BY Munn & Co.
ATTORNEYS

UNITED STATES PATENT OFFICE.

BYRON E. CAGLE, OF MEDINA, KANSAS.

CORN-PLANTER.

SPECIFICATION forming part of Letters Patent No. 428,827, dated May 27, 1890.

Application filed December 21, 1889. Serial No. 334,583. (No model.)

*To all whom it may concern:*

Be it known that I, BYRON E. CAGLE, of Medina, in the county of Jefferson and State of Kansas, have invented new and useful Improvements in Corn-Planters, of which the following is a specification.

My invention relates to that class of corn-planters in which the seed-dropping mechanism is located on the traveling wheels, and in which the cut-off slides are automatically operated during the revolution of such wheels, such slides to be operated to drop the seed at the proper time by engaging a fixed portion of the planter-frame. My invention has for its object to provide a corn-planter which will be simple in construction, cheap as to cost, and positive in its desired operation.

To this end my invention consists in certain novel features of construction and peculiar combination of parts, all of which will hereinafter be fully described in the annexed specification and particularly pointed out in the claims, reference being had to the accompanying drawings, in which—

Figure 1 is a perspective view of my improved corn-planter. Fig. 2 is a vertical section of one of the seed-boxes and the dropping mechanism. Fig. 3 is a detail section on the line 3 3, Fig. 2; and Fig. 4 is a section taken on the line 4 4, Fig. 2, showing the seed-box in top plan.

Referring to the accompanying drawings, A A indicate the supporting-wheels, which are mounted on the axle B, journaled in a suitably-constructed sulky-frame C, such construction consisting of the forwardly-extending side beams $c\, c$, connected by a cross-beam $c'$ at their front end, and the tongue D, which is supported on the cross-bar $c'$, as shown, its rear end forked at $d$ and connected with the axle, as clearly shown in Fig. 1 of the drawings.

E denotes a toothed wheel fixedly secured to the axle B, disposed between the forked end of the beam D, which is adapted to be engaged by a stop $f$, secured upon the lower face of a forwardly-projecting bar F, pivoted to the rear of the wheel E between the forked ends $d\, d$ of the beam D, its forward end $f'$ extended within convenient reach of the driver's foot, preferably by passing said end $f'$ through a slot $g$ in the supporting-bar $G'$ of the driver's seat G. Said stop $f$ is normally held from engagement with the wheel E by means of the spring H, (clearly shown in Fig. 1 of the drawings.) By this construction it will be observed that when it is desired to stop the axle from revolving, to drag the machine on the wheels, (for a purpose hereinafter described,) the operator, by simply pressing his foot on the bar F and forcing the stop $f$ into engagement with the wheel E, can in an instant lock the axle and wheels from turning.

Each of the supporting-wheels is provided with a series of openings $a\, a$, preferably four, as shown, and with radial arms J, disposed between and secured to the spokes I I, which form guides or supports for the seed-delivery devices K K, one of which is shown in detail in Figs. 2, 3, and 4.

As the construction and arrangement of the seed holding and delivery devices on both wheels are similar, I shall only describe one of said devices and its connection to the wheel A in detail.

Referring to Figs. 2, 3, and 4, it will be seen that the said device K consists of a rectangular-shaped box provided at one side with a detachable plate or cover K', which is secured to the body of the box by the lateral plates $k\, k$, which engage angle-plates $k'\, k'$ and are held thereto by the bolts $k^2$, as shown.

The box proper is divided into an upper or seed compartment $K^2$, provided with a seed-inlet opening at its top, normally closed by the cover 1.

2 denotes the bottom of the seed-chamber $K^2$, which may be slightly dished toward a discharge-opening $2^a$ in said bottom, and 3 denotes a supplemental bottom, provided with a discharge-opening $3^a$ about centrally thereof, and which is disposed over the mouth of the seed-discharge chute or drill L.

M denotes the seed-slide valve, which is disposed between the bottoms 2 and 3, and is provided with a pocket $m$, of a size to receive one or more kernels of corn, which is normally under the opening $2^a$ in said valve. Said valve is also provided with an extension M', having an inclined or beveled face $m'$, which normally projects in the path of a fixed portion of the frame, such projection consisting of depending bars or legs N, secured to the side arms C C, which are disposed to project just in advance of the point where the wheels rest upon the ground, said legs being provided with rearwardly-extending arms $n\ n$, (clearly shown in Figs. 1 and 4 of the drawings.) By this construction it will be observed that when the wheels are revolved and the seed-boxes reach their lowermost or operative position the inclined edge $m'$ of the slide M will engage the legs N and be forced inward, thereby causing the opening $m$ to pass from under the opening $2^a$ and carry the seed over to and discharge through the opening $3^a$ into the chute L, the arms $n\ n$ serving to hold slides M in their inward position until the chute lifts out of the ground, thereby permitting the seed to surely pass from the mouth of the chute, and also preventing the gate L' from closing too soon and from picking up dirt on its rising from the the ground.

By reference to Fig. 2 it will be seen that the rear end $M^3$ of the slide M extends through an opening 5 in the back of the box and engages a flat spring O, said spring normally forcing the said slide to its outward position.

The delivery or drill chute L is formed with a gate portion L', pivoted at $l$, said gate operating within the side walls $L^2$ of the chute, the lower end thereof normally closing the discharge end of the chute, while its upper end is formed with upwardly-projecting fingers $l'\ l'$, which pass through slots $3^b$ in the bottom piece 3 and enter sockets 6 in the slide M, as most clearly shown in Fig. 3 of the drawings. By this construction it will be seen that as the slide is pushed in when it engages the legs N and the seed is dropped into the chute it (the slide M) will engage the fingers $l'$ and swing the gate on its pivot, so as to open the discharge end of the chute, and when the slide M resumes its normal position it will cause the gate to again close the said discharge-opening.

In the practical attachment of the seed-boxes to the wheel I connect them for radial adjustment with the wheels, so as to permit of the drill-chute being projected to a greater or less degree beyond the periphery of the wheels. To this end I form the inner faces of the arms J, which may be connected with the spokes, as shown, or which in the practical construction of my machine may constitute spokes of the wheel, with transverse rack-sections P, with which engage stops Q, formed on spring-plates Q', secured to the sides of the box, such plates having knobs $q$ to admit of their being readily pulled away from said sections P. This construction admits of the boxes being adjusted to or from the rim of the wheel, so as to regulate the depth which the ends $K^3$ of the drill-chute shall enter the ground, said ends passing through the radial openings $a$, as shown. It also admits of said ends being drawn inside of the periphery of the wheels when it becomes necessary to lock the axle and wheels in the manner before stated.

The object of locking the wheels is to hold the machine in any position while turning at the end of rows.

From the foregoing description, taken in connection with the drawings, the advantages and operation of my improved planter will readily appear. It will be seen that the same is very simple in construction, and that by adjusting the boxes in the manner described the same may be readily adapted so as to make a complete check-rower. This may be accomplished as follows: Put the same number of dropping devices upon each wheel and at equal distances apart. Then, as both wheels revolve upon the same axle, each wheel drops a hill at exactly the same time. This gives straight rows one way if the machine is driven straight, thereby making a perfect check-row.

In the practical construction of my machine I may construct the wheels so as to plant two feet apart by arranging the dropping devices two feet apart on the wheels, and have said wheels four feet apart, thus making the hills two feet apart and the rows four feet apart, and then by straddling said rows on the return trip I make all of the rows and hills two feet apart each way.

It will be understood that I do not limit myself to the exact manner shown for adjustably securing said dropping devices to the wheels, as the wheels may be specially constructed in various ways, so as to accommodate the said devices.

Having thus described my invention, what I claim, and desire to secure by Letters Patent, is—

1. In a corn-planter, the combination, with the driving-wheels provided with a series of radial apertures $a\ a$ in their rims, of a series of radially-disposed seed holding and dropping devices held for radial adjustment to or from the inner face of said wheel, means for holding said devices in adjusted positions, drill-chutes connected to the seed-dropping mechanism and projected through the radial apertures, and means for operating the dropping devices, substantially as and for the purpose described.

2. The combination, with the wheels A, provided with the radial guides J, having transversely-notched inner faces, of the seed holding and dropping boxes disposed between the outer ends of said guides, spring-arms secured to the sides of said boxes, provided with stops adapted to engage the said notched faces, whereby said boxes are adjustably secured in relation to the rim of wheels A, substantially as and for the purpose described.

3. The combination, with the frame C, the axle provided with a toothed wheel E, the wheels A, mounted on said axle, provided with radial apertures, and the seed-dropping devices provided with the drill-chutes adapted to project through said apertures, said devices held for radial adjustment in relation to said axle, whereby the chutes may be drawn in flush with the rim of the wheels A of the lock-stop secured to the frame, said stop adapted to engage the wheel E and lock the same from turning when depressed into engagement therewith, substantially as shown and described.

4. The combination, with the main frame having depending legs N, the wheels A, provided with radial openings $a\ a$ and a series of metal guides J J, of the seed-boxes K, secured between the outer ends of said guides, said boxes each provided with a seed-chamber having an outlet, as $2^a$, a bottom 3, having an outlet, as $3^a$, a cut-off valve M, having a feed socket or opening $m$, operating between said openings $2^a$ and $3^a$, said valve provided with an extension M', having cam-like inclined end $m'$, adapted to engage the said legs N, a drill or seed-dropping chute disposed below the opening $2^a$, its lower end projected through the openings $a\ a$, said chute provided with a pivoted cut-off gate connected at one end to the slide M and operated by the movement thereof, substantially as and for the purpose described.

BYRON E. CAGLE.

Witnesses:
MATTHEW L. CAGLE,
J. J. KETCHEL.